Figure 1:
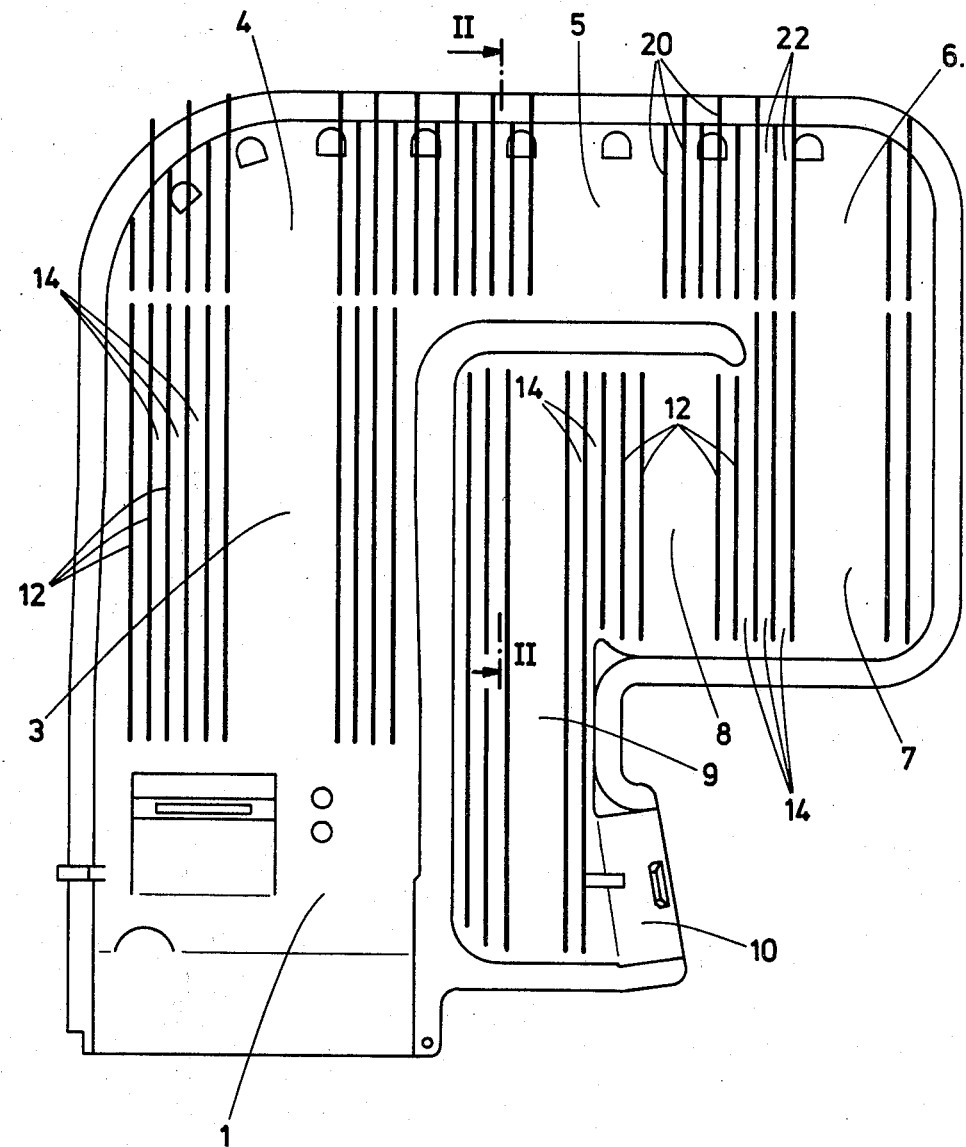

United States Patent [19]

Kreis

[11] 4,421,095
[45] Dec. 20, 1983

[54] ROOM HEATING APPARATUS FOR SMALL SPACES

[75] Inventor: Philipp Kreis, Munich, Fed. Rep. of Germany

[73] Assignee: Philipp Kreis GmbH & Co., Munich, Fed. Rep. of Germany

[21] Appl. No.: 305,983

[22] Filed: Sep. 28, 1981

[51] Int. Cl.³ .......................... F24C 3/00; F28F 1/20
[52] U.S. Cl. .................................. 126/91 R; 126/118; 165/181
[58] Field of Search .................. 126/99 D, 118, 91 R, 126/91 A, 116 R, 116 A; 165/181, 185; 123/41.69

[56] References Cited

U.S. PATENT DOCUMENTS

| | | | |
|---|---|---|---|
| 172,014 | 1/1876 | Gold | 126/118 |
| 305,713 | 9/1884 | Ryan | 126/118 |
| 758,373 | 4/1904 | Marsh et al. | 165/181 |
| 783,886 | 2/1905 | Niemeczek | 126/118 |
| 1,524,520 | 1/1925 | Junkers | 126/118 |
| 1,935,025 | 11/1933 | Hart | 165/181 |
| 2,196,828 | 4/1940 | Hess | 126/91 R |
| 2,215,519 | 9/1940 | Anderson | 126/118 |
| 2,374,380 | 4/1945 | Rodgers | 123/41.69 |
| 2,752,126 | 6/1956 | Crone | 126/91 R |
| 2,791,992 | 5/1957 | Robinson | 123/41.69 |
| 2,796,860 | 6/1957 | Pinkus et al. | 126/91 R |
| 2,876,631 | 3/1959 | Bailey | 165/181 |
| 3,007,467 | 11/1961 | Humphrey | 126/118 |
| 3,205,560 | 9/1965 | Loehlein | 165/181 |
| 3,399,661 | 9/1968 | Kreis | 126/118 |
| 3,504,850 | 4/1970 | Mossbach | 126/118 |

FOREIGN PATENT DOCUMENTS

| | | | |
|---|---|---|---|
| 29121 | 5/1884 | Fed. Rep. of Germany | 126/118 |
| 175944 | 6/1935 | Switzerland | 126/118 |

Primary Examiner—Daniel J. O'Connor
Attorney, Agent, or Firm—Alfred E. Miller

[57] ABSTRACT

A room heating apparatus for small spaces adapted to be fired with a gaseous or vaporized liquid fuel, especially for mobile homes, has a combustion gas channel with an upper horizontal cross channel serving as a heat exchanger. Outer fins (12, 20) project from the sidewalls (16) of the combustion gas channel. In order to increase the heat exchange from the upper cross channel (5) and avoid the overheating also under greater loads, the outer fins of the cross channel (5) are formed as large surface fins (20), which project essentially further in the right angle direction from the vertical sidewalls (16) of the cross channel (5) than the outer fins (12) arranged thereunder extend from their respective channel wall.

7 Claims, 3 Drawing Figures

ROOM HEATING APPARATUS FOR SMALL SPACES

This invention relates to a room heating apparatus for small rooms, fired with a gaseous or vaporized liquid fuel, especially for mobile homes, with a burning space separated with respect to the heating room and combustion gas channels connected thereto and serving as heat exchangers, the combustion channel having an upper horizontal cross channel as well as outer fins provided on the side walls of the combustion gas channel.

In a room heating apparatus of this type (DE-OS1454295) the combustion gas channel is formed in a single way in its length and provided with smooth channel walls extending therethrough. An upwardly directed channel part meanders downwardly from a horizontal cross channel. The sidewalls of the combustion gas channels are parallel, in each case in a common flat lying surface, which has outer ribs extending outwardly in the current direction of ascending warm air. Under greater loading of this heating apparatus the cross channel is excessively heated and as a consequence the output of the apparatus is impaired. As a remedy, in another room heating apparatus of this type (DE-PS2016560), the upper cross channel is provided over its entire length with a saddle-shaped cover with a slope of more than 40°. Also outer fins project from this saddle-shaped cover, the outer edges of fins connecting flush with the outer edges of the remaining outer fins and are aligned to one another to the shape of the current channels passing therethrough. Also if in so doing fins with enlarged surfaces are provided in the saddle region, then also this cross channel can be heated to undesirably hot temperatures, especially if it connects to an upward extending channel part.

The invention therefore is based upon the problem of so improving a heating apparatus with a cross channel, that the heat delivery is intensified especially from this cross channel to the ascending air and thereby reduces its outer surface temperature.

This problem is thereby solved in a heating apparatus of the above-described type, in accordance with the invention, in that the outer fins of the cross channel at least in the region of the greatest heating are formed with large surface fins, whose outer edges have a greater distance from the vertical walls of the cross channel than the outer edges of the outer fins provided thereunder from its corresponding channel wall.

Due to the provision of the large surfaced fins, which project over the fin sections located thereunder, not only is the heat transfer surface remarkably enlarged in the hottest region of the combustion gas channels, i.e., the cross channel, but additionally a lifting recess is produced for the outer cooler air layers, which have not yet been heated by the outer fins. This cooler outer air current is heated greatly by the large surface fins, so that the heat dissipation is intensified in this region and the high surface temperature in this region is reduced. A lower surface temperature for the heating apparatus is especially desirable for the assembly in mobile homes or other mobile and narrow rooms.

Advantageously these large surface fins should extend along the entire cross channel.

In the event that the combustion gas channel should continue with an upwardly directed channel part arranged under the cross channel, then it is advantageous to extend the large surface fins to the complete height of the cross channel. In this case the cross channel forms, on its entire surface opposite the remainder of the fins, enlarged lifting recesses for the outer air layers. Depending upon the circumstances it can be advantageous either to limit the large surface fins only to the upper section of the cross channel, or to extend them over the entire surface.

While an elongation of the large surface fins downwardly over the cross channel reduces their efficiency with respect to the cross channel, on the other hand it can be advantageous to let the large surface fins stand out upwardly over the cross channel cover.

A noteworthy reduction of the surface temperature of the cross channel is produced if the large surface fins are so deep as to be about double of the depth of the outer fins lying thereunder. An enlargement over three fold results in small special additional advantages, while on the other hand a reduction of the surface temperature is still ascertainable if the large surface fins are widened only to minimum extent over the outer fins.

Finally, a further improvement can be obtained, if the outer fins or fin sections provided under the large surface fins are extended continuously or stepwise at the highest to the height of the large surface fins.

Figure 2:
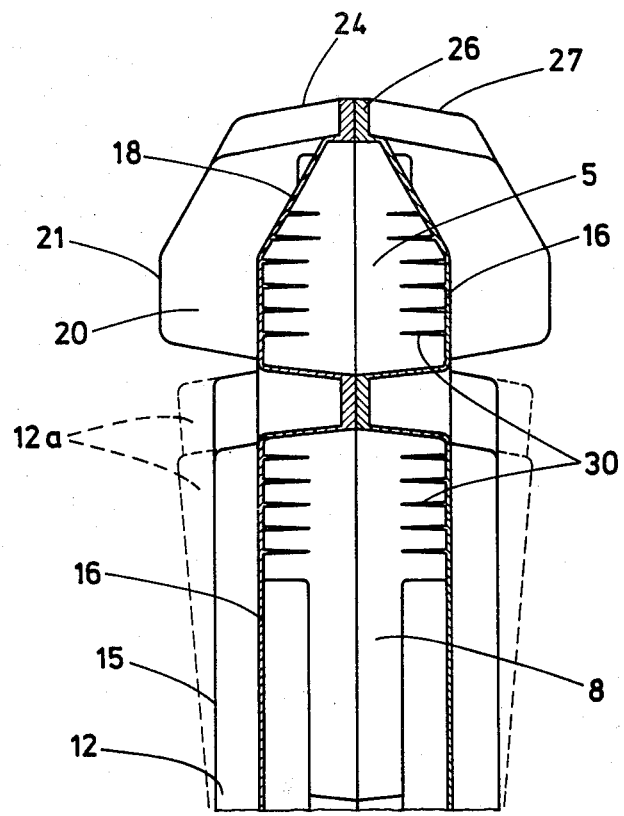
Figure 3:
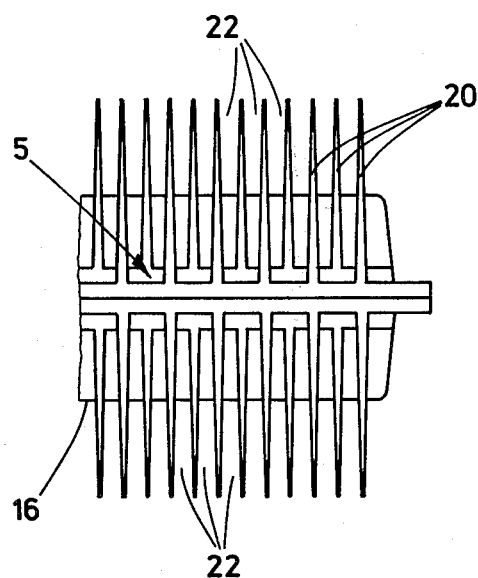

The invention will be more completely described in the following with reference to an example of a heating apparatus with a combustion gas channel with outward guiding channel parts, that is also shown schematically in the drawing. It shows:

FIG. 1 a side view of the appartus,

FIG. 2 a section through a cross channel along lines II—II of FIG. 1, enlarged, and FIG. 3 a plan view of a part of the cross channel.

The illustrated room heating apparatus includes a combustion chamber 1, in which a burning location (not illustrated) is located. This is connected to an upward guiding channel part 3 of a combustion gas channel serving as a heat exchanger, which changes over above to a horizontal cross channel 5 by means of a turnaround 4. Further turnarounds 6 and 7 lead to a lower horizontal channel section 8 and finally to a downwardly directed drop channel 9 which terminates with a exhaust connection 10 for a chimney connector. The construction of the upward and downward directed channel parts of the combustion gas channels is only to be considered as an example; especially the channel guide connected to the cross channel can also take other courses. The air supply under the burning position is guided to the illustrated heating apparatus through an inlet connection under the living room space, while the combustion gases flow out through the exhaust connection 10 arranged above the room floor to the chimney (not shown) connected thereto after having flowed through the combustion gas channels. The flow spaces of the channel sections adjacent one another are offset from one another, although connected to one another material wise through interconnecting flanges.

The sidewalls of the combustion gas channels have outer fins 12 which extend in the direction of the warm air rising up to the heating apparatus. These outer fins are not only formed on the ascending combustion gas channel 3, and on the cross channel 5 with turnarounds 4 and 6, but also on the downward guiding channel parts 7, 8 and 9. The fins form flow spaces 14, aligned with one another, for the ascending air. The outer fins on the upward and downward directed channel parts project with their outer edges 15 about 10 to 15 millimeters from the outer surface of the channel sidewalls 16

(FIG. 2) and since these sidewalls extend in parallel planes, then this also holds true for the outer edges. The illustrated heating apparatus consists for example of two-shaped shells connected to one another along a central plane. As is also apparent in FIG. 2, the cross channel 5 has a saddle-shaped cover surface 18. The incline of this saddle amounts to 45 to 60%. It provides smoother guiding of the warm air outside of the apparatus, and thereby the effective heating surface and the flow cross section of the cross channels are also enlarged. Large surface fins 20 are formed on the sidewalls of these cross channels, instead of the above-noted outer fins. In the described embodiment of the invention the outer edges 21 extend out substantially further than the outer edges 15. The current recesses 22 formed by these large surface fins 20 are appropriately about two to three times deeper than the flow passageways 14. In this manner the rising air currents of the lower outer fins which are not as yet being appreciably warmed and therefore can directly take on heat from the cross channel, rise to the lifting recesses of the cross channel. This leads in return to a considerable reduction of the heating temperature on the upper surface of the cross channel. The large surface fins extend appropriately to the full height and whole length of the cross channels inclusive of the respective turnaround 6. Their outer edges 21 run mostly parallel to the sidewalls of the cross channels. If there is a saddle cover, then these edges can likewise extend back. If possible, the large surface fins extend over the cross channels, so that then the upper edges 24 end at the height of a shell flange 26 and not at the saddle cover as does the upper edge 27. The inner fins in this example are indicated by the reference numeral 30.

The large surface fins can extend also only for a lengthwise region of the cross channels, advantageously whereby the region permitting the greatest amount of overheating is provided. If the cross channel is not provided with a saddle-shaped cover surface, then the large surface fins likewise can accommodate this shape. Finally the possibility also exists that the large surface fins are disposed only in the upper sections of the cross channels, whereby then the lower fin sections have only the height of the above outer fins. This solution is employed if no channel parts, and thereby also no outer fins, are provided beneath the cross channels.

In determined situations it is advantageous to widen the lower outer fins 12 gradually toward the top or stepwise to the wedge-shaped outer laminations 12a (shown in dashed lines), whereby the lift of the outer warm air is increased; since the heating already starts earlier. In a heating apparatus with sidewalls and outer fins lying in different planes, the large heating surfaces are heightened sufficiently that they project sideways over the outer fins positioned thereunder.

I claim:

1. In a room heating apparatus for small spaces adapted to be fired with a gaseous or vaporized liquid fuel, such as in mobile homes, and having a combustion space, a combustion gas channel connected thereto serving as a heat exchanger provided with an upper horizontal cross channel having vertical walls, and outer fins vertically arranged on the sidewalls of said combustion gas channel, the improvement comprising said outer fins of the cross channel being formed at least in the region of its greatest heating as large surface fins, having outer edges which have a greater distance from the respective vertical walls of the cross channel than the distance of outer edges of the outer fins provided thereunder from their respective channel walls, and each of said large surface fins extending for substantially the full height of the respective vertical walls of the cross channel.

2. Heating apparatus according to claim 1, wherein the distance of the outer edges of the large surface fins from the corresponding channel wall is at least twice as great as the distance of the outer edge of the lower outer fins from their respective channel wall.

3. Heating apparatus according to claim 1 wherein the large surface fins extend for the full height of the cross channel.

4. Heating apparatus according to claim 1 wherein at least one part of the large surface fins extends upwardly from the cross channel.

5. Heating apparatus according to claim 1 wherein the large surface fins extend substantially parallel to the sidewalls of the cross channels.

6. Heating apparatus according to claim 1 wherein the large surface fins are offset opposite the lower outer fins.

7. Heating apparatus according to claim 1 wherein the lower outer fins are enlarged gradually or stepwise up to the greatest distance of the large surface fins.

* * * * *